United States Patent [19]

Hepworth

[11] 4,078,424
[45] Mar. 14, 1978

[54] HAND-HELD TROLLING SPEEDOMETER

[76] Inventor: Keith H. Hepworth, 3843 West 3620 South, Salt Lake City, Utah 84120

[21] Appl. No.: 774,286

[22] Filed: Mar. 4, 1977

Related U.S. Application Data

[63] Continuation-in-part of Ser. No. 700,096, Jun. 28, 1976, abandoned.

[51] Int. Cl.² ............................................. G01C 21/10
[52] U.S. Cl. ...................................................... 73/184
[58] Field of Search .................... 73/184, 222; 116/26; 114/209

[56] References Cited

U.S. PATENT DOCUMENTS

| 168,432 | 10/1975 | Trenchard | 73/184 |
| 3,681,987 | 8/1972 | Ruskin | 73/228 |

FOREIGN PATENT DOCUMENTS

| 37,642 | 10/1922 | Norway | 73/184 |

Primary Examiner—Donald O. Woodiel

Attorney, Agent, or Firm—H. Ross Workman; J. Winslow Young

[57] ABSTRACT

A hand-held trolling speedometer or speed indicator for use by a person riding in a boat. The trolling speedometer includes a drogue, an indicator, and a flexible line interconnected between the drogue and a spring-biased marker in the indicator. The indicator includes a transparent column having a plurality of indicia which, in cooperation with the spring-biased marker, provides a visual indication of the resistance encountered by the drogue and, thereby, the speed of the boat. The drogue is fabricated as an open end container having a bottom with a plurality of enlarged apertures therein. A reducer cap is adapted to be removably mounted on the bottom of the drogue to selectively reduce the size of the apertures. The drogue also serves as a container for stowage of the flexible line and the indicator portion of the speedometer. A bail is affixed adjacent the open end of the container and serves as the attachment point for the flexible line.

9 Claims, 3 Drawing Figures

U.S. Patent        March 14, 1978        4,078,424
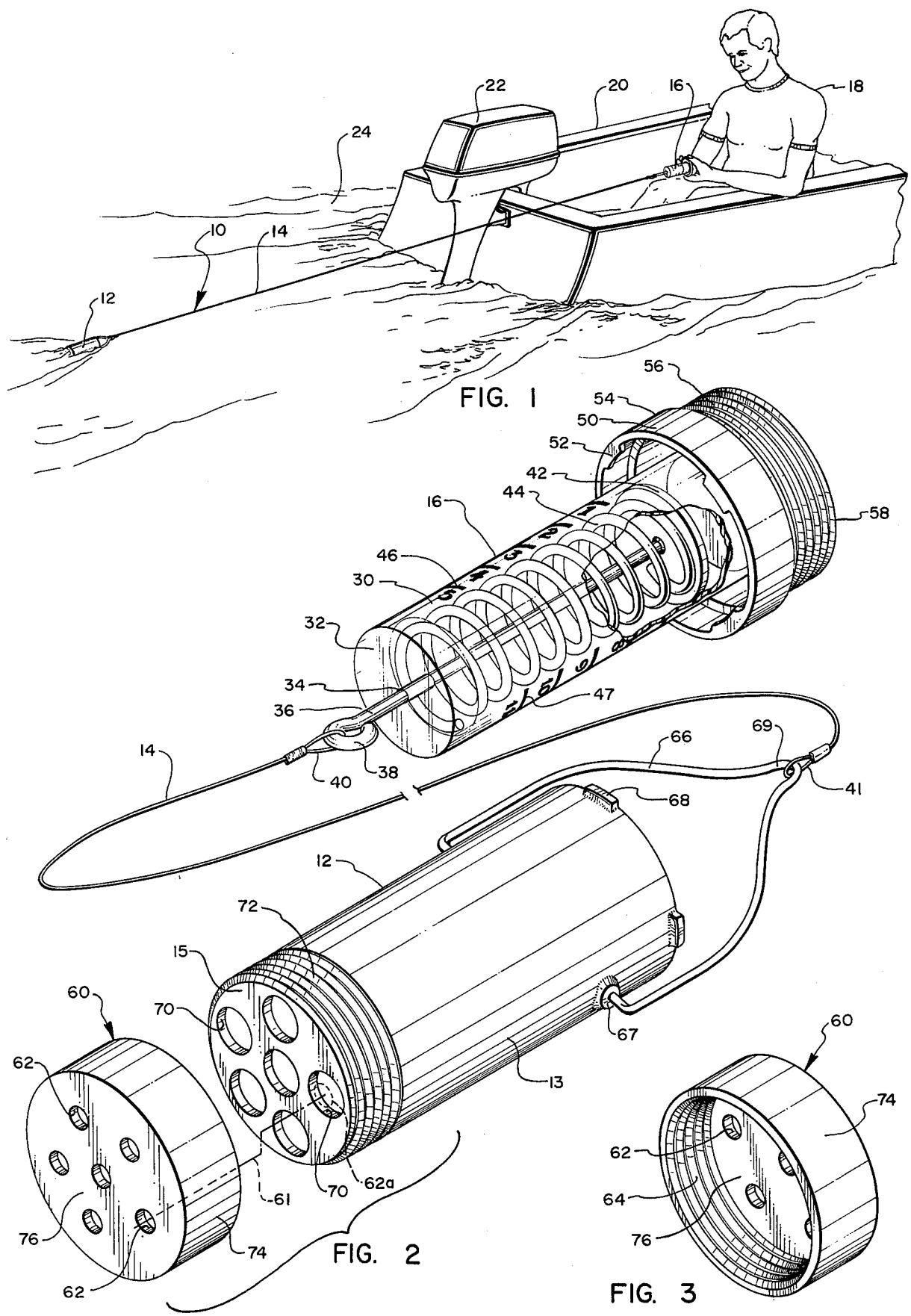

HAND-HELD TROLLING SPEEDOMETER

This is a continuation-in-part application Ser. No. 700,096 filed June 28, 1976, now abandoned.

BACKGROUND

1. Field of the Invention

This invention relates to devices for indicating the speed at which a boat is travelling on a body of water and, more particularly, to a hand-held trolling speed indicator.

2. The Prior Art

The act of fishing from a moving boat by pulling a lure through the water is referred to in the art as trolling which is the preferred form of fishing for certain types of fish. Trolling causes the lure to perform in such a manner as to entice a desired game fish to strike the lure and thereby become engaged by the hook. Each type of lure has an optimum speed at which the lure should be drawn through the water in order for the lure to behave in the desired manner. Lure behavior is referred to in the art as "action." For example, if the lure is drawn too slowly through the water, there is very little lure action thereby rendering the lure substantially useless as a means for enticing the fish to strike the lure. On the other hand, drawing the lure too rapidly through the water imparts excessive motion to the lure. Accordingly, a skilled fisherman engaged in the art of trolling is deeply concerned with the speed at which the lure is being drawn through the water and, correspondingly, the desired degree of action imparted to the lure by movement through the water.

Trolling involves the boat being driven about a body of water, whether a river, lake, or the like, in various directions to pull the lure through possible areas where fish may be congregated. Once the fisherman has received a strike from a fish, it is customary to troll repeatedly through the same area in an attempt to entice other fish to strike the lure. Importantly, every attempt is made to duplicate the exact speed conditions for each pass of the lure as were present when the initial strike was obtained. This is done on the assumption that the same lure action will entice other fish in the vicinity to strike the lure.

Trolling speeds are relatively slow, generally in the range of about 100 to 700 feet per minute. A boat travelling at such relatively slow rates of speed is significantly affected by wind direction and wind speed variations. Accordingly, in the absence of suitable speed indicating devices, it is practically impossible to duplicate the trolling speed for each trolling pass through the body of water.

Numerous speed indicating devices have been proposed for water craft. However, until the present invention, no speed indicating device has been provided which is compact, easily hand held, readily adapted to different speed ranges, and accomodates being stored in the tackle box of a fisherman. In view of the foregoing, it would be an advancement in the art to provide a hand-held trolling speedometer. It would be an even further advancement in the art to provide a drogue for the trolling speedometer having a selectively variable degree of drag to adapt the trolling speedometer for use at different trolling speed ranges. Such an invention is disclosed herein.

BRIEF SUMMARY AND OBJECTS OF THE INVENTION

The present invention provides an improved trolling speedometer having a hand-held indicator and spring-biased marker therein. The spring-biased marker is interconnected by a flexible line to a drogue which is adapted to be drawn through the water by the motion of the boat. A closure is formed as an integral part of the indicator and serves as a handle for the indicator and as a closure for the drogue when the drogue is used as a stowage container for the indicator. Adjustment means are included for suitably altering the amount of resistance imparted by the drogue to thereby adapt the trolling speedometer of this invention to different trolling speed ranges.

It is, therefore, a primary object of this invention to provide improvements in trolling speed indicators.

Another object of this invention is to provide a hand-held trolling speedometer which readily accomodates use at different trolling speed ranges.

Another object of this invention is to provide an improved method for determining the speed of a boat.

Another object of this invention is to provide a lightweight, compact, trolling speedometer wherein the drogue also serves as a stowage container for the trolling speedometer.

These and other objects and features of the present invention will become more fully apparent from the following description and appended claims taken in conjunction with the accompanying drawing.

BRIEF DESCRIPTON OF THE DRAWING

FIG. 1 is a pictorial representation of the trolling speedometer of this invention in the environment of a boat;

FIG. 2 is an exploded perspective view of the trolling speedometer in its operating configuration with a drag adjustment cap in spaced relationship to the drogue; and FIG. 3 is a perspective view of the interior of the drag adjustment cap of FIG. 2.

DETAILED DESCRIPTION OF THE PREFERRED EMBODIMENTS

The invention is best understood by reference to the drawing wherein like parts are designated with like numerals throughout.

With reference to FIGS. 1–3 of the drawing, the trolling speedometer is shown generally at 10 and includes a drogue 12 interconnected to an indicator 16 by flexible line 14. Drogue 12 is formed as an open end container having a cylindrical sidewall 13, and a bottom 15. Bottom 15 includes a plurality of enlarged apertures 70 the function of which will be set forth more fully hereinafter.

A bail 66 is mounted to drogue 12 by being engaged in a raised boss 67 on either side of cylindrical sidewall 13. Both sides of bail 66 are held away from the respective sidewall 13 of drogue 12 to thereby accomodate a closure when the same is mounted to the open end of drogue 12 as will be discussed more fully hereinafter. Bail 66 pivotally supports drogue 12 when drogue 12 is pulled through the water and also serves as a handle for trolling speedometer 10 when indicator 16 and fexible line 14 are stowed in drogue 12. Bail 66 includes a centrally located arch 69 to which a clip 41 on the end of flexible line 14 is releasably engaged as a securement means between flexible line 14 and drogue 12.

Apertures 60 in bottom 15 are configured as relatively enlarged apertures. The size of apertures 70 is the principal determining factor as to the amount of resistance encountered by drogue 12 as drogue 12 is pulled through the water. Restriction of the opening of each of apertures 70 is obtained by securing a reducer cap 60 to the base of drogue 12.

Reducer cap 60 serves as a drag adjustment cap and is formed with a circular base 76 circumscribed by a cylindrical sidewall or rim 74. A plurality of reduced apertures 62 are formed in base 76. The internal surface of cylindrical sidewall 74 is formed with threads 64 which are dimensionally predetermined to correspond with threads 72 on the outside diameter of cylindrical sidewall 13. Superimposition of an aperture 62 over an aperture 70 is indicated schematically in FIG. 2 by broken line 61. Aperture 62 is its superimposed position over aperture 70 is indicated in broken lines at 62a. Alternatively, mating studs and grooves (not shown) in each of drogue 12 and reducer cap 60 may be included to provide securement between the two and also to assure proper alignment of reduced apertures 62 with enlarged apertures 70. By this simple expedient, the size of the apertures in drogue 12 are selectively reduced thereby adapting drogue 12 for greater resistance upon being pulled through the water for a suitably altered speed indicator range as will be discussed more fully hereinafter.

Trolling speed indicator 16 is configured with a cylindrical, transparent column 30 extending axially from a closure 50 and terminating in a base 32. Transparent column 30 is configured with a relative reduced length and diameter so as to accomodate insertion of column 30 into the interior of drogue 12 as a means of stowing trolling speed indicator 16. A plurality of indicia 46 and 47 are included on column 30 and are visible in cooperation with a marker 42 as a means for visually indicating the speed of boat 20 relative to water 24. Base 32 includes an axial bore 34 therein through which a shank 36 passes. Marker 42 is secured to the end of shank 36 and a spring 44 is included as a means for spring-biasing marker 42 against a pulling force exerted on shank 36. The portion of shank 36 extending from base 32 is formed as an eye 38 to which a clip 40 is releasably attached. Clip 40 serves as a means for interconnecting flexible line 14 to shank 36.

Closure 50 is secured to column 30 and includes a plurality of lugs 52 which are formed on the inside surface of sidewall 54. Lugs 52 are dimensionally configurated to matingly engage a plurality of corresponding lugs 68 peripherally surrounding the open end of drogue 12. The opposite face of closure 50 is formed with a reduced diameter hub 56. Hub 56 serves as a stowage site for reducer cap 60 and includes a cylindrical sidewall which dimensionally corresponds to the internal diameter of rim 74. Hub 56 includes threads 58 which matingly receive threads 64 of reducer cap 60.

Reducer cap 60 may be selectively engaged with either threads 72 on drogue 12 for the purpose of providing restricted apertures (apertures 62) in the base of drogue 12 as set forth hereinabove, or may be stored as a portion of closure 50 by being threadedly engaged with hub 56. In either reducer cap 60 configuration, closure 50 readily serves as a handle for holding the trolling speed indicator 16 portion of trolling speedometer 10.

THE METHOD

The method of the present invention involves a fisherman, indicated schematically herein at 18, riding in boat 20 while boat 20 is propelled over the surface of water 24 by a motor 22. Fisherman 18 is able to quickly and easily determine the trolling speed of boat 20 by using trolling speedometer 10. This is done by disengaging closure 50 from drogue 12 and clipping flexible line 14 to arch 69 in bail 66 by means of clip 41. Drogue 12 is then placed in water 24 where its movement through water 24 encounters drag resistance as a result of water 24 entering the open end of drogue 12 and being restricted to flow through apertures 70 or 62. The resistance encountered by drogue 12 pulls flexible line 14 and shank 36. Movement of shank 36 compresses spring 44 with a corresponding movement of marker 42. The resistance of spring 44 and the spacing of indicia of 46 and 47 is selectively predetermined in correspondance with the size of apertures 70 and 62 so as to provide a direct reading of the speed with which boat 20 is traveling over the surface of water 24.

Each of the indicia 46 and 47 are coordinated with a set of apertures in drogue 12 having a particular size, either apertures 62 or apertures 70. For example, indicia 46 may be selectively set for low trolling speeds, and thereby, coordinated with apertures 62 in reducer cap 60. The reduced size of apertures 62 means that for a given speed of boat 20 an increased drag resistance will be encountered by drogue 12 thereby imparting a greater pull against spring 44.

On the other hand, indicia 47 may be suitably predetermined for a higher trolling speed range and, selectively, coordinated with the size of apertures 70. Apertures 70 are enlarged thereby reducing the degree of drag resistance encountered by drogue 12 when the same is pulled through the water. Under reduced drag conditions as encountered by apertures 70, a higher speed of boat 20 is required for the same degree of relative degree of movement of marker 42 with respect to indicia 47.

Under higher speed conditions, reducer cap 60 is removed from the base of drogue 12 and placed on the end of closure 50 as set forth hereinabove. Placement of reducer cap 60 on end closure 50 permits fisherman 18 to readily ascertain the drag condition of drogue 12 and thereby observe the appropriate indicia, indicia 46 or indicia 47, for visual observation of the trolling speed. Additionally, reducer cap 60 and the appropriate indicia 46 or 47 may be selectively color coded so as to provide additional indication as to the appropriate indicia to observe during operational use of trolling speedometer 10.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A trolling speed indicator comprising:
a hand-held, hollow, transparent column;
a plurality of indicia placed along the length of the column;

a movable marker slideably cooperating interiorly of the column and visible with relation to the indicia;

spring-biasing means for biasing the marker;

an open-ended container, the containter being adapted to be pulled as a drogue through a body of water by movement of a boat, wherein the drogue is configurated with a plurality of enlarged apertures in the bottom of the container, the area of the opening formed by the enlarged apertures being selectively coordinated with the spring-biasing means and a first set of indicia so as to provide a directly readable trolling speed indication at a first speed range; and means for interconnecting the drogue with the movable marker, the resistance of the water encountered by the drogue tending to pull the movable marker against the spring-biasing means.

2. A trolling speed indicator comprising:

a hand-held, hollow, transparent column;

a plurality of indicia placed along the length of the column;

a movable marker slidably cooperating interiorly of the column and visible with relation to the indicia;

spring-biasing means for biasing the marker;

an open-ended container, the container being adapted to be pulled as a drogue through a body of water by movement of a boat, wherein the trolling speed indicator includes a reducer cap adapted to be releasably secured to the end of the drogue, the reducer cap having a plurality of reducer apertures therein, the reducer cap accomodating alignment of the reduced apertures with the enlarged apertures of the drogue so as to restrict the area of opening in the base of the drogue, the area of the reduced apertures being selectively coordinated with the spring-biasing means and a second set of indicia so as to provide a directly readable trolling speed indication at a second speed range; and means for interconnecting the drogue with the movable marker, the resistance of the water encountered by the drogue tending to pull the movable marker against the spring-biasing means.

3. The trolling speed indicator defined in claim 2 wherein the reducer cap is adapted to be releasably secured to one end of the hand-held, transparent column for stowage when removed from the drogue.

4. A trolling speedometer comprising:

a hand-held trolling speed indicator comprising:

a transparent column having a plurality of indicia along the length of the column;

a marker slidably movable inside the column and visible through the column;

spring-biasing means for biasing the marker toward a first end of the column;

a shank secured to the marker and passing through the second end of the column; and a closure mounted to the first end of the column;

a drogue comprising:

a cylindrical container having an open end and a bottom, the bottom having a plurality of enlarged apertures therein and a bail pivotally secured to the container adjacent the open end;

a reducer cap comprising a plurality of reduced apertures therein;

a means for selectively securing the reducer cap to the bottom of the drogue with the reduced apertures in registry with the enlarged apertures in the bottom of the drogue; and a flexible line interconnected between the shank and the bail.

5. The trolling speedometer defined in claim 4 wherein the drogue and the closure include engagement means for releasably securing the closure to the drogue, the drogue accomodating receiving the transparent column therein when the closure is secured to the drogue.

6. The trolling speedometer defined in claim 4 wherein the closure includes releasable engagement means for selectively engaging the reducer cap when the reducer cap is removed from the drogue.

7. A method for determining trolling speed of a moving boat comprising the steps of:

preparing a hand-held indicator by securing a marker to the end of a shank and placing the marker in a transparent column with the shank extending from the column while biasing the marker into the column with a spring means and securing the column to a closure, the closure serving as a handle for the hand-held indicator;

securing a drogue to the end of the shank extending from the column with a flexible line, the drogue being formed as an open end cylinder having a bottom with a plurality of enlarged apertures therein;

placing the drogue in the water while holding to the closure to accomodate movement of the boat pulling the drogue through the water, the water imparting resistance to the drogue in proportion to the speed of the boat with the drogue pulling the marker against the spring in proportion to the drag resistance of the water; and visually observing the position of the marker through the transparent column.

8. The method of claim 7 wherein the securing step further comprises engaging the closure to the drogue as a means for storing the indicator between uses and disengaging the closure from the drogue prior to placing the drogue in the water.

9. The method of claim 7 where the placing step further comprises attaching a reducer cap to the bottom of the drogue, the reducer cap having a plurality of reduced apertures, the attaching step comprising registering the reduced apertures over the enlarged apertures thereby increasing the drag resistance of the drogue.

* * * * *